United States Patent [19]

Chiba

[11] Patent Number: 5,332,318
[45] Date of Patent: Jul. 26, 1994

[54] ROLLER BEARING UNIT FOR PLANETARY GEAR
[75] Inventor: Moichi Chiba, Yokosuka, Japan
[73] Assignee: NSK Ltd., Tokyo, Japan
[21] Appl. No.: 12,937
[22] Filed: Feb. 3, 1993
[30] Foreign Application Priority Data
　Feb. 3, 1992 [JP]　Japan .................. 4-010637[U]
[51] Int. Cl.⁵ ............................................. F16C 33/58
[52] U.S. Cl. ................................... 384/569; 384/564
[58] Field of Search ............... 384/551, 561, 564, 569, 384/586, 588, 450

[56] References Cited

U.S. PATENT DOCUMENTS

| | | | |
|---|---|---|---|
| 1,593,580 | 7/1926 | Knowles | 384/564 |
| 1,995,571 | 3/1935 | Lott | 384/564 |
| 2,029,265 | 1/1936 | Kylén | 384/564 |
| 2,334,227 | 11/1943 | Stallman | 384/569 |
| 2,747,951 | 5/1956 | Wallgren | 384/564 |
| 3,954,313 | 5/1976 | Haenel | 384/569 |
| 4,162,109 | 7/1979 | Müennich et al. | 384/569 |

Primary Examiner—Thomas R. Hannon
Attorney, Agent, or Firm—Helfgott & Karas

[57] ABSTRACT

A roller bearing unit for a planetary gear is made such that the rollers between the thrust washers are restrained from interference with the thrust washers upon an inclining of the planetary gear either by making the distance between the axially inner faces of washers sufficiently large, or by preventing axial movement of the guide ring between the rollers, so that the axially outer ends are prevented from rubbing hard against the axially inner faces of the washers during running.

3 Claims, 4 Drawing Sheets

ROLLER BEARING UNIT FOR PLANETARY GEAR

BACKGROUND OF THE INVENTION

1. Field of the Invention

The present invention relates to a roller bearing unit for planetary gear used in an automatic transmission unit for vehicle to rotatably support the planetary gear on a support shaft in the transmission unit.

2. Description of the Prior Art

A typical planetary gear unit of a vehicle automatic transmission is arranged as shown in FIG. 7. In this arrangement, the planetary gear unit is rotatably provided with respect to a support shaft 1. The planetary gear unit comprises a sun gear 2, a planetary gear 6 which is rotatably supported on the support shaft 1 and a support member 3 which is mounted so as to be freely rotatable about an axis of rotation of the sun gear 2 of the planetary gear unit. The support shaft 1 is fixedly attached at its one end (the left end in FIG. 7) to the support member 3, and formed with a cylindrically convex inner race 4 on a central outer peripheral surface thereof.

The planetary gear unit further has a retaining collar 5 which is securely attached to the outer peripheral surface at the other end of the support shaft 1 (right end in the figure).

The planetary gear 6 is provided with gear teeth 7 on an outer peripheral surface thereof, and a cylindrically concave outer raceway 8 formed on an inner peripheral surface thereof. The planetary gear 6 is maintained on the support shaft 1 so as to be freely rotatable about the central outer peripheral surface of the support shaft 1 between the retaining collar 5 and the support member 3.

A double row of first and second free floating rollers 9 are provided without retainer between the inner raceway 4 and the outer raceway 8. A guide ring 10 for guiding the axially inner ends of the rollers 9 (the ends of the rollers 9 of the respective rows facing each other) is provided between the rows of rollers 9. The outer peripheral face of the guide ring 10 is provided adjacent to the outer raceway 8, so that the guide ring 10 rotates with the planetary gear 6.

At least one thrust washer 11 (two washers in the drawings) is provided at the axially inner end faces of the retaining collar 5 and the support member 3 (the faces facing each other), respectively, so that the axially outer ends of the plurality of rollers 9 are faced to the thrust washers 11.

With the above construction, the planetary gear 0 is supported so as to rotate freely with respect to the support shaft 1, and meshes with the sun gear 2 and with a ring gear 12 which is maintained concentric with the axis of the sun gear 2. The gears 2, 6 and 12 are selectively rotated or immobilized with respect to each other, a speed change, or reverse rotation of the output with respect to the input may be achieved in the planetary gear unit.

With the above mentioned planetary gear unit, the distance L between the support member 3 and the retaining collar 5, or between the pairs of thrust washers 11 when the thrust washers 11 are provided,—this is the case for all examples of the present specification, is made a little larger than the sum of the length $l(el)_1$ of the first rollers 9 in one (first row) of the rows of rollers, plus the length $l(el)_2$ of the second rollers 9 in the other row (second row) of rollers (in general $l(el)_1 = l(el)_2$), plus the axial length a of the guide ring 10. That is, $L > l(el)_1 + l(el)_2 + a$. Consequently, under normal conditions, the axially outer ends of the respective rollers 9 do not rub hard against the thrust washers 11. However, if the guide ring 10, which rotates in accordance with operation of the planetary gear unit, becomes inclined, there is the possibility of the axially outer ends of the rollers 9 rubbing hard against the thrust washers 11.

More specifically, as shown in FIG. 8, during rotation of the planetary gear unit for transmission, the planetary gear 6 may become inclined as a result of axial components of force T1, T2 produced as a result of meshing between the planetary gear 6 and the sun gear 2 and ring gear 12. Consequently the end portions 9a (adjacent the thrust washers 11) of the first and second rollers 9 are driven by the outer raceway 8. As a result, the axes of the rollers 9 are skewed relative to the axis of the support shaft 1 giving rise to a force in an axial direction of the respective rollers 9. As shown by the arrow A in FIG. 8, this force at one point on the inner peripheral surface of the outer raceway 8 pushes on the first rollers 9 of one (first row) of the rows of rollers in an axially inward direction A, while at an opposite point on the inner peripheral surface of the outer raceway 8 (180 degrees around the periphery) the similar force pushes on the second rollers 9 of the other row (second row) of rollers in an axially inward direction indicated by the arrow B of the same figure.

Consequently, due to the inward pushing forces on the double row of rollers 9 at opposite positions 180 degrees around the periphery, like couple of forces, the guide ring 10 disposed between the rows of rollers 9 becomes inclined, so that the apparent axial length of the guide ring 10 is increased to b (b>a).

As a result, the outer ends of the respective rollers 9 rub hard against the thrust washers 11 so that as well as producing an increase in drive (transmission) losses, there is the possibility of failure due to excessive friction and seizure under harsh conditions such as with insufficient lubrication.

SUMMARY OF THE INVENTION

It is an object of the present invention to provide a roller bearing unit for planetary gear unit which addresses the above unsatisfactory situation, specifically in which the axially outer ends of the rollers are prevented from rubbing hard against the axially inner faces of the support member and the retaining collar or washers for them.

DETAILED DESCRIPTION OF THE PREFERRED EMBODIMENTS

According to a first aspect of the present invention, there is provided a roller bearing unit for planetary gear similar to the conventional roller bearing unit for planetary gear in that it comprises a support member, a support shaft having first and second ends and a central portion, the first end fixedly attached to the support member, the central portion formed with a cylindrically convex inner raceway on its outer peripheral surface, a retaining collar fixed to the second end, a planetary gear having outer and inner pripheral surfaces, the outer peripheral surface formed with a gear and the inner peripheral surface formed with a cylindrically concave outer raceway, so as to rotate freely on the outer peripheral surface of the support shaft between the retaining collar and the support member, a double row of free floating rollers provided without retainer between the inner raceway and outer raceway, and a guide ring provided at a intermediate portion between the two rows of rollers for guiding the axially inner ends of the plurality of rollers. In addition, with the roller bearing unit for planetary gear of the first aspect of the present invention, the guide ring is fixed to either of the outer peripheral surface of the support shaft or the inner peripheral surface of the planetary gear so as not to move axially relative.

In this construction the guide ring is not displaced even under a force tending to change the axial position of the rollers during running, so that the apparent axial length of the guide ring does not increase. Consequently, the respective rollers are not forced outward by the guide ring. Hence the axially outer ends of the respective rollers are not pressed hard against the axially inner face of the support member or the axially inner face of the retaining collar, thereby overcoming the problem of severe rubbing between the outer ends of the respective rollers and the inner faces of the support member and the retaining collar.

Figure 1:
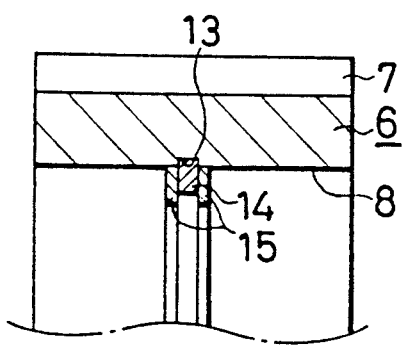
FIG. 1 is a cross-sectional view of essential elements of a first embodiment of the present invention.

FIG. 1 shows an embodiment according to the present invention. A planetary gear 6 has a gear 7 formed on an outer peripheral surface thereof and an outer raceway 8 formed on an inner peripheral surface thereof with a retainer groove 13 formed at an axially central position on the outer raceway 8. A stop ring 14 is retained in the retainer groove 13 with an outer peripheral half portion fittingly engaged therein. Furthermore, a floating ring 15 is provided on either side of the radially inner half portion of the stop ring 14 protruding from the outer raceway 8, thereby making up a guide ring.

Figure 7:
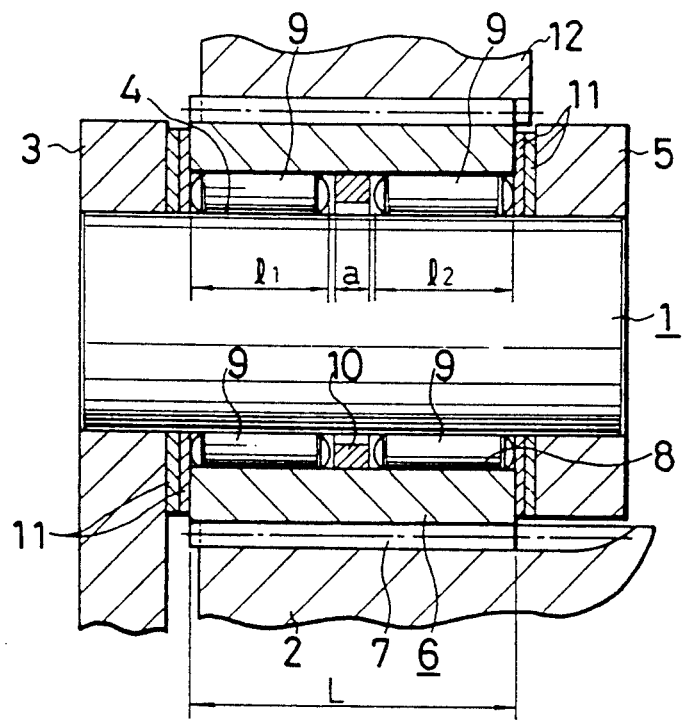
FIG. 7 is a cross-sectional view of a conventional construction under normal conditions.

The planetary gear 6 having the stop ring 14 and floating rings 15 provided at an intermediate portion of the inner peripheral surface of the outer raceway 8, as with the conventional construction shown in FIG. 7, is rotatably supported on a support shaft 1 by means of rollers 9. Furthermore, in this arrangement, the axially inner ends of the respective rollers 9 face the floating rings 15, respectively.

With the roller bearing unit for planetary gear of the present invention having the above construction, the guide ring comprised of the stop ring 14 and the floating rings 15 is not displaced even when a load is applied in an axial direction upon the rollers 9 during rotation. Consequently, the apparent axial length of the guide ring does not increase.

As a result, the respective rollers 9 are not pressed axially outwards by the guide ring, and hence the outer end portions of the respective rollers 9 are not pressed hard against the inner face of the support member 3 or the inner face of the retaining collar 5. Hence severe rubbing between the axially outer ends of the respective rollers 9 and the axially inner faces of the support member 3 and the retaining collar 5 does not occur.

Figure 2:
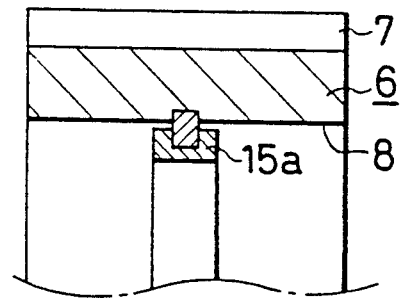
FIG. 2 is a cross-sectional view of essential elements of a second embodiment.

FIG. 2 shows a second embodiment according to the present invention. With this embodiment, a radially inner peripheral half of the stop ring 14 is fitted into a groove of open channel shape in cross section formed in an outer peripheral surface of a single floating ring 15a, so that the axially inner ends of the rollers 9 of the double rows (not shown in FIG. 2) face toward the axially opposite sides of the floating ring 15a. Other details of the construction and operation are substantially the same as for the above mentioned first embodiment.

Figure 3:
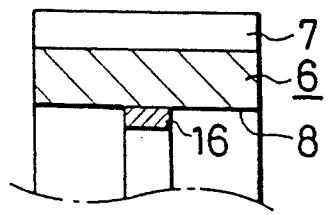
FIG. 3 is a cross-sectional view of essential elements of a third embodiment.

FIG. 3 shows a third embodiment according to the present invention. With this embodiment, a cylindrical shaped spacer 16 is press fitted into the outer raceway 8 at an intermediate portion thereof, thereby making up a guide ring for guiding the double rows of rollers 9. Other details of construction and operation are substantially the same as for the above described first and second embodiments.

Figure 4:
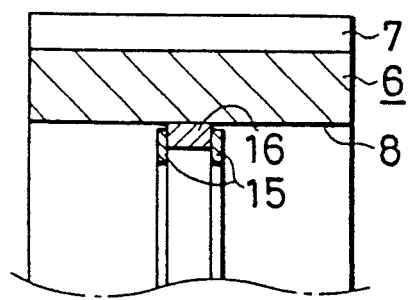
FIG. 4 is a cross-sectional view of essential elements of a fourth embodiment.

FIG. 4 shows a fourth embodiment according to the present invention. With this embodiment, the guide ring comprises a cylindrical shaped spacer 16 press fitted into the outer raceway 8 at an intermediate portion thereof as well as a floating ring 15 provided on each side of the spacer 16 to guide the double row of rollers 9. Other details of the construction and operation are substantially the same as for the above described first to third embodiments.

Figure 5:
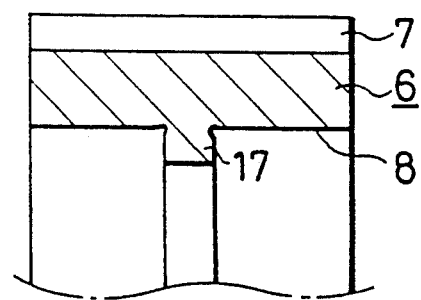
FIG. 5 is a cross-sectional view of essential elements of a fifth embodiment.

FIG. 5 shows a fifth embodiment according to the present invention. With this embodiment, the guide ring comprises a radially inwardly directed flange member 17 formed integral with the outer raceway 8 at an intermediate portion thereof. The double row of rollers 9 (not shown in FIG. 5) are guided by the flange member during operation. Other details of the construction and operation are substantially the same as for the above described first to fourth embodiments.

According to another aspect of the present invention, there is provided a roller bearing unit for planetary gear, wherein the dimensions of the components are made so that a relationship $L > l(el)_1 + l(el)_2 + b$ is established, wherein L is the distance between the support member and the retaining collar, $l(el)_1$ is the axial length of the rollers in one of the rows of rollers, $l(el)_2$ is the axial length of the rollers in the other row of rollers, and b is the apparent axial length of the guide ring when the center axis of the guide ring is inclined at a maximum amount to the center axis of the support shaft.

With this construction of the roller bearing unit for planetary gear, the axially outer ends of the rollers do not rub hard against the axially inner face of the support member or of the retaining collar even when a force is applied to the rollers to displace them in an axial direction during running. The distance L between the support member and the retaining collar is greater than the total of the length $l(el)_1$ of the rollers in one row of rollers, plus the length $l(el)_2$ of the rollers in the other row of rollers, plus the apparent axial length b of the guide ring, even when the axis of rotation of the guide ring is inclined at a maximum incline to the axis of the support shaft. Consequently, even when the respective rollers are forced outward by the guide ring, the outer axially ends of the respective rollers do not press hard against the axially inner face of the support member or the inner face of the retaining collar. Hence the severe rubbing between the axially outer ends of the respective rollers and the axially inner faces of the support plate and retaining collar is overcome.

Figure 6:
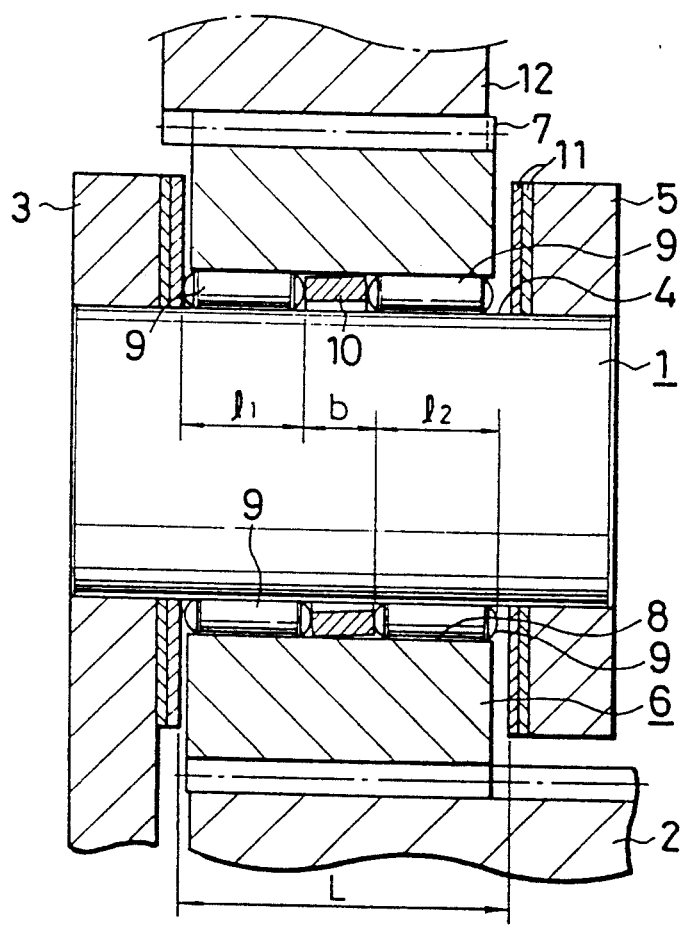
FIG. 6 is a cross-sectional view of a sixth embodiment.
Figure 8:
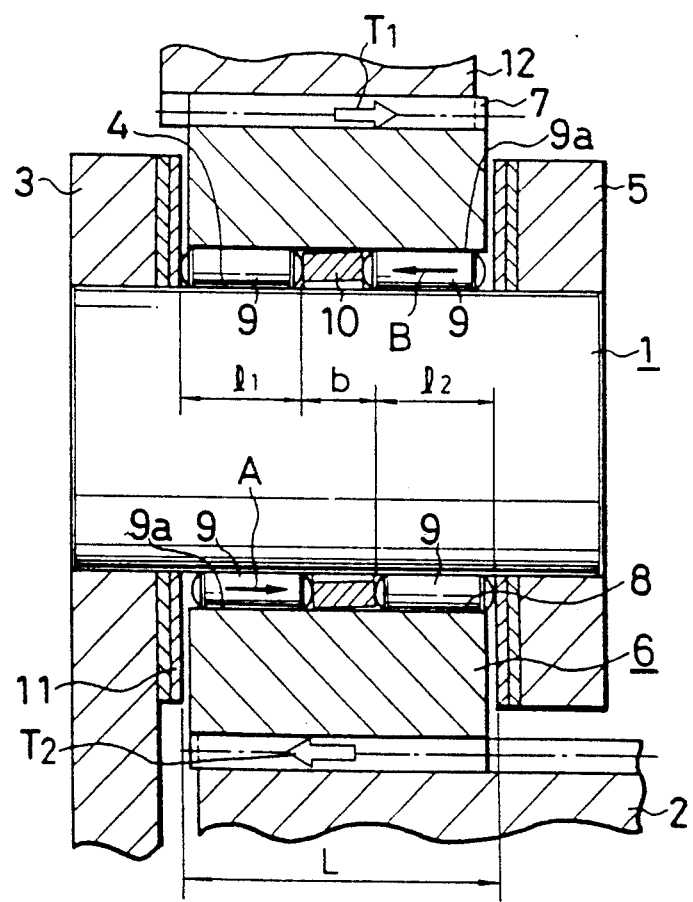
FIG. 8 is a cross-sectional view of the conventional construction of FIG. 7 under displaced conditions.

FIG. 6 shows a sixth embodiment according to the present invention. With this embodiment, the structural components of the assembled body are similar to those described in FIGS. 7 and 8 for the conventional construction. In particular, with this embodiment, the dimensions of the components are made so that the distance L between axially inner most face of the first thrust washers 11 provided on the inner face of the support member 3 and the axially innermost face of the second thrust washers 11 provided on the inner face of the retaining collar 5 is greater than the sum of the length $l(el)_1$ of the first rollers 9 of one (first row) of the rows of rollers plus the length $l(el)_2$ of the second rollers 9 of the other row (second row) of rollers plus the apparent axial length b of the guide ring 10 when the axis of rotation of the guide ring 10 is inclined at a maximum inclination with respect to the axis of the support shaft 1 (ie. $L > l(el)_1 + l(el)_2 + b$).

With this embodiment, even when the axis of the guide ring 10 is inclined at a maximum amount with respect to the axis of the support shaft 1, the distance L between the axially innermost face of the first thrust washer 11 on the inner face of the support member 3 and the axially innermost face of the second thrust washer 11 on the inner face of the retaining collar 5 is greater than the total of the length $l(el)_1$ of the first rollers 9 of one (first row) of the row of rollers plus the length $l(el)_2$ of the second rollers 9 of the other row (second row) of rollers plus the apparent axial length b of the guide ring 10.

As a result, even when the respective rollers 9 are forced outward by the guide ring 10, the axially outer ends of the respective rollers 9 are not pressed hard against the axially inner face of the first thrust washers 11 provided on the axially inner face of the support member 3, or the axially inner face of the second thrust washers 11 provided on the axially inner face of the retaining collar 5, so that severe rubbing between the axially outer ends of the respective rollers 9 and the axially inner faces of the respective thrust washers 11 does not occur.

With the roller bearing unit for planetary gear of the present invention, due to the above construction, the severe rubbing between the axially outer ends of the rollers and the mating portions adjacent the axially outer ends of the rollers is alleviated. Hence the transmission losses and failure due to abnormal wear and seizure of the components can be significantly reduced.

Aspects of the present invention have been described by way of example only and it should be appreciated that modifications and additions may be made thereto without departing from the scope thereof as defined in the appended claims.

What is claimed is:

1. A roller bearing unit for a planetary gear comprising a support member, a retaining collar, a support shaft having a first end fixedly attached to said support member and a second end fixedly attached to said retaining collar with an outer peripheral surface of a central portion formed with a cylindrically convex inner raceway, a planetary gear having an outer peripheral surface formed with a gear and an inner peripheral surface formed with a cylindrically concave outer raceway, provided so as to rotate freely on said outer peripheral surface of said support shaft between said retaining collar and aid support member, a double row of free floating rollers provided between said inner raceway and outer raceway, and a guide ring provided between said two rows of rollers for guiding the axially inner ends of said plurality of rollers, wherein said guide ring is fixed to ne of said outer peripheral surface of said support shaft and said inner peripheral surface of said planetary gear, thereby preventing axial displacement of the guide ring, wherein said guide ring comprises a cylindrical shaped spacer press fitted into said outer raceway at an intermediate portion thereof and floating rings each being provided on each side of said spacer, respectively.

2. A roller bearing unit for a planetary gear according to claim 1, wherein axially inner ends of respective ones of said rollers face said floating rings, respectively.

3. A roller bearing unit for a planetary gear according to claim 1, wherein each floating ring has an outer peripheral surface facing said outer raceway but being spaced therefrom.

* * * * *